United States Patent [19]
Lee

[11] Patent Number: 5,944,851
[45] Date of Patent: Aug. 31, 1999

[54] ERROR CONCEALMENT METHOD AND APPARATUS

[75] Inventor: Sang-Hoon Lee, Seoul, Rep. of Korea

[73] Assignee: Daewoo Electronics Co., Ltd., Rep. of Korea

[21] Appl. No.: 08/977,449

[22] Filed: Nov. 24, 1997

[30] Foreign Application Priority Data

Dec. 27, 1996 [KR] Rep. of Korea .................. 96-72672

[51] Int. Cl.$^6$ .................................................. G06K 9/00
[52] U.S. Cl. .................... 714/799; 714/747; 714/800; 382/168; 382/170; 382/232; 382/242; 348/616
[58] Field of Search .................................. 714/747, 799, 714/800, 801, 802, 803, 774; 348/420, 416, 615, 616; 382/248, 232, 239, 243, 244

[56] References Cited

U.S. PATENT DOCUMENTS 5,481,627 1/1996 Kim .......................................... 382/254
5,495,298 2/1996 Uchida et al. ............................ 348/615
5,793,893 8/1998 Kim ........................................ 382/242

FOREIGN PATENT DOCUMENTS 2316567 2/1998 United Kingdom .

*Primary Examiner*—Albert De Cady
*Assistant Examiner*—Esaw Abraham
*Attorney, Agent, or Firm*—Anderson Kill & Olick

[57] ABSTRACT

Bit streams transmitted from a coding system through a transmission channel are divided on a block-by-block basis based on bit numbers thereof and a parity bit added to each bit stream is checked to decide whether or not each bit stream is error bit stream having one or more error bits therein. Based on the check result, either each bit stream or a proximate bit stream for each bit stream is selected as an optimum bit stream, wherein the proximate bit stream is generated based on degrees of proximity between masked transform coefficients for each candidate bit stream and masked transform coefficients for each of reference bit streams spatially adjacent to each bit stream.

14 Claims, 5 Drawing Sheets

FIG.5

| 0 | 1 | 1 | 2 | 2 | 3 | 3 | 4 |
|---|---|---|---|---|---|---|---|
| 1 | 1 | 2 | 2 | 3 | 3 | 4 | 4 |
| 1 | 2 | 2 | 3 | 3 | 4 | 4 | 5 |
| 2 | 2 | 3 | 3 | 4 | 4 | 5 | 5 |
| 2 | 3 | 3 | 4 | 4 | 5 | 5 | 6 |
| 3 | 3 | 4 | 4 | 5 | 5 | 6 | 6 |
| 3 | 4 | 4 | 5 | 5 | 6 | 6 | 7 |
| 4 | 4 | 5 | 5 | 6 | 6 | 7 | 7 |

ERROR CONCEALMENT METHOD AND APPARATUS

FIELD OF THE INVENTION

The present invention relates to an error concealment method and apparatus for use in a video signal decoding system; and, more particularly, to a method and an apparatus for concealing bit errors in a bit stream transmitted from a block-based image signal encoder.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially in the case of such low bit-rate video signal encoders as video-telephone and teleconference systems. Among various video compression techniques, the so-called hybrid coding technique, which combines temporal and spatial compression techniques together with a statistical coding technique, is known to be most effective.

Most hybrid coding techniques employ orthogonal transform, quantization of transform coefficients, and Variable Length Coding (VLC). The orthogonal transform, which reduces or removes spatial redundancies therebetween, is used to convert a block of digital image data into a set of transform coefficients. Specifically, in the orthogonal transform such as a Discrete Cosine Transform (DCT) or the like, the image data is divided into a plurality of non-overlapping equal-sized blocks, for example, blocks of 8×8 pixels, and each of the blocks is transformed from the spatial domain to the frequency domain.

By processing such transformation coefficient data with quantization and VLC, the amount of data to be transmitted can be effectively compressed. Thereafter, the encoded image signal is transmitted to a decoder via a transmission channel.

Since, however, errors are apt to occur during the transmission process, in order to reduce or rectify the errors, conventionally, a channel coding has been carried out with respect to the encoded image signal by employing various error control coding methods. In a conventional error control coding method, extra bits are added to each predetermined set of source codes to detect and conceal the errors during a decoding process. Various error concealment schemes such as a POCS (Projections onto Convex Sets) method have been proposed to conceal or estimate the pixel data of an error containing block, to thereby compensate for the degradation which may have occurred in the transmission process. However, such prior art error concealment methods remain unsatisfactory as they fail to fully take into account the characteristics of a given image signal.

Besides, blocking effect, a phenomenon in which the border line of a block becomes visible at the receiving end, occurs since a frame is encoded in units of blocks; and may become more serious as the quantizer step size becomes larger, i.e., as the frequency of the coefficient becomes higher, in which case the blocks undergo more coarse quantization. Accordingly, if a certain block is much brighter or darker than its adjacent blocks, and, a fixed large quantizer step size is used for an intra block DC coefficient, the intensity differences between said certain block and its adjacent blocks may become even more pronounced, resulting in a more severe blocking effect and depreciating the quality of the image. Although in an inter mode coding with motion compensated frame prediction, blocking effects are not so disturbing, but are still noticeable.

Therefore, if one or more bit errors generated by a transmission channel environment or the like are detected in video signals expressed in a multiplicity of bit streams, it is required to correct or conceal the error bits by taking into account neighbor bit streams adjacent to any bit stream in which errors are detected.

One of such error concealment techniques for concealing bit errors in a bit stream based on the neighbor bit streams is disclosed in a copending commonly assigned application, U.S. Ser. No. 08/914,929, "METHOD AND APPARATUS FOR CONCEALING ERRORS IN A BIT STREAM". This technique first decides whether or not a bit stream is error bit stream having one or more error bits. Thereafter, a proximate bit stream for the error bit stream is obtained when the bit stream is decided to be an error bit stream to provide same as an optimum bit stream for the error bit stream, wherein the proximate bit stream is obtained by selecting one of a plurality of candidate bit streams which are derived by using the error bit stream, depending on the degrees of proximity between the candidate bit streams and a multiplicity of neighbor bit streams which are adjacent to the error bit stream.

In the conventional error concealment technique, however, transform coefficients of the candidate bit streams and their neighbor bit streams are used to calculate the degrees of proximity therebetween, which may not provide an optimum bit stream in case that difference values between the transform coefficients of the candidate bit streams are very small.

SUMMARY OF THE INVENTION

It is, therefore, a primary object of the invention to provide an improved method and apparatus for concealing errors in a bit stream transmitted from a block-based image signal encoder by taking into account frequency characteristics of the candidate bit streams and their neighbor bit streams.

In accordance with one aspect of the present invention, there is provided a method for concealing bit errors in a bit stream of a video frame signal on a block-by-block basis to selectively provide either one of a proximate bit stream and the bit stream as an optimum bit stream to a video signal decoder, wherein the video frame signal is divided into a plurality of equal-sized blocks and bit numbers of bit streams for the blocks are different from each other, the method comprising the steps of:

(a) finding sequentially bit streams corresponding to the blocks based on the bit numbers thereof;

(b) checking a parity bit added to each bit stream to decide whether or not said each bit stream is an error bit stream having one or more error bits therein;

(c) if it is decided that said each bit stream is not an error bit stream, outputting said each bit stream as the optimum bit stream and, if otherwise, generating a plurality of candidate bit streams by using the error bit stream, and deciding whether each candidate bit stream has a first type of frequency characteristics or a second type of frequency characteristics to generate a type decision signal;

(d) in response to the type decision signal, masking said each candidate bit stream with either one of a first and a second set of predetermined weighted values to output a masked candidate bit stream therefor; and (e) producing a proximate bit stream for said each bit stream to provide same as the optimum bit stream, wherein the proximate bit stream is obtained based on degrees of proximity between said each masked candidate bit stream and reference bit streams spatially adjacent to the error bit stream, each reference bit stream having no errors or being already concealed errors therein.

In accordance with another aspect of the present invention, there is provided an apparatus for concealing bit errors in a bit stream of a video frame signal on a block-by-block basis to selectively provide either one of a proximate bit stream and the bit stream as an optimum bit stream to a video signal decoder, wherein the video frame signal is divided into a plurality of equal-sized blocks and bit numbers of bit streams for the blocks are different from each other, the apparatus comprising:

means for detecting sequentially bit streams of the blocks based on the bit numbers thereof;

error detection means for checking a parity bit added to each bit stream to decide whether or not said each bit stream is an error bit stream having one or more error bits therein;

type decision means, if it is decided that said each bit stream is not an error bit stream, outputting said each bit stream as the optimum bit stream and, if otherwise, generating a plurality of candidate bit streams by using the error bit stream, and deciding whether each candidate bit stream has a first type of frequency characteristics or a second type of frequency characteristics to generate a type decision signal;

masking means, in response to the type decision signal, masking said each candidate bit stream with either one of a first and a second set of predetermined weighted values to output a masked candidate bit stream therefor; and proximity bit stream generation means for producing a proximate bit stream for said each bit stream to provide same as the optimum bit stream, wherein the proximate bit stream is obtained based on degrees of proximity between said each masked candidate bit stream and reference bit streams spatially adjacent to the error bit stream, each reference bit stream having no errors or being already concealed errors therein.

BRIEF DESCRIPTION OF THE DRAWINGS

The above and other objects and features of the present invention will become apparent from the following description of preferred embodiments given in conjunction with the accompanying drawings, in which:

FIG. 5 illustrates a diagram for explaining a method for masking a set of transform coefficients of a bit stream in accordance with the invention.

DETAILED DESCRIPTION OF THE PREFERRED EMBODIMENTS

Figure 1:
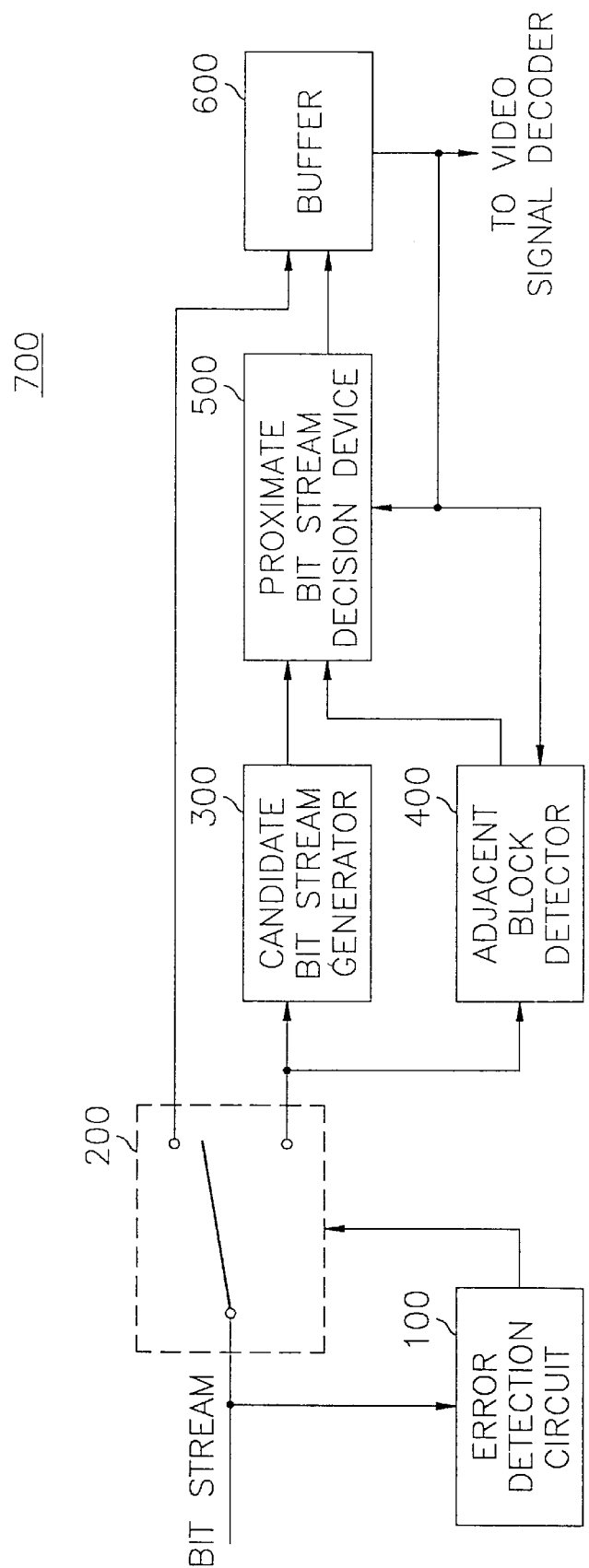
FIG. 1 is a block diagram of an apparatus for concealing errors in a bit stream transmitted from a block-based video signal encoder in accordance with the present invention.

Referring to FIG. 1, there is shown a block diagram of an apparatus 700 for detecting and concealing one or more errors in a video frame signal expressed in a sequence of bits in accordance with the present invention, wherein the video frame signal is divided into and processed as a plurality of equal-sized blocks whose width and height are, e.g., 8×8 or 16×16 pixels.

A bit stream for each of blocks transmitted through a transmission channel on a block-by-block basis is applied to an error detection circuit 100 and a switch 200, wherein the bit stream contains a parity bit for error detection as well as video data. The error detection circuit 100 sequentially receives the bit streams for the blocks, decides whether a bit stream corresponding to each block has one or more error bits based on a parity bit check therein and provides a switch control signal representing the result of the error detection for said each block to the switch 200. If one or more error bits are detected in a bit stream for a block, the switch 200 transmits the bit stream for the block to a candidate bit stream generator 300 and an adjacent block detector 400; and, if otherwise, the switch 200 sends the bit stream to a buffer 600 directly.

If the bit stream for the block is determined to have an error, meaning that the bit stream and the block are referred to as an error bit stream and an error block, respectively, the candidate bit stream generator 300 inverts any one bit in the error bit stream to generate a plurality of candidate bit streams. In other words, each candidate bit stream differs one bit from the error bit stream so that the candidate bit streams differ from each other as much as two bits. For example, if an error bit stream "01011001" is provided with one bit error, 8 number of candidate bit streams will be provided.

In another instance of the invention, if an error bit stream has two or more bit errors, candidate bit streams can be generated by taking account of reference bit streams of the error bit stream. For example, four bit streams positioned at an upper-left and an upper right corners and an upper and a left sides of the error block can be determined as the candidate bit streams. In another preferred embodiment of the invention, a mean bit stream and a zero bit stream can be added to the four bit streams to make six candidate bit streams, wherein the mean bit stream represents a mean of said four bit streams and all bits of the zero bit stream are "0". The candidate bit streams so generated are sequentially provided to a proximate bit stream decision device 500.

In the meantime, the adjacent block detector 400 determines neighbor blocks of the error block based on the position data thereof and retrieves bit streams of the neighbor blocks from the buffer 600, the neighbor blocks having a predetermined positional relationship with the error block. In accordance with the present invention, two blocks positioned at an upper and a left sides of the error block can be determined as the neighbor blocks, referring to as the left and the upper blocks. In another instance of the invention, another set of blocks, e.g., at the upper, the left and the upper-left of the error block can be decided as the neighbor blocks. The bit streams of the neighbor blocks are then provided to the proximate bit stream decision device 500 as the reference bit streams to the error bit stream of the error block.

By using the reference bit streams, the proximate bit stream decision device 500 determines a proximate bit stream of the error bit stream and provides same to the buffer 600, wherein the proximate bit stream is selected among the candidate bit streams based on the degrees of proximity between each of the candidate bit streams and the reference bit streams.

Figure 2:
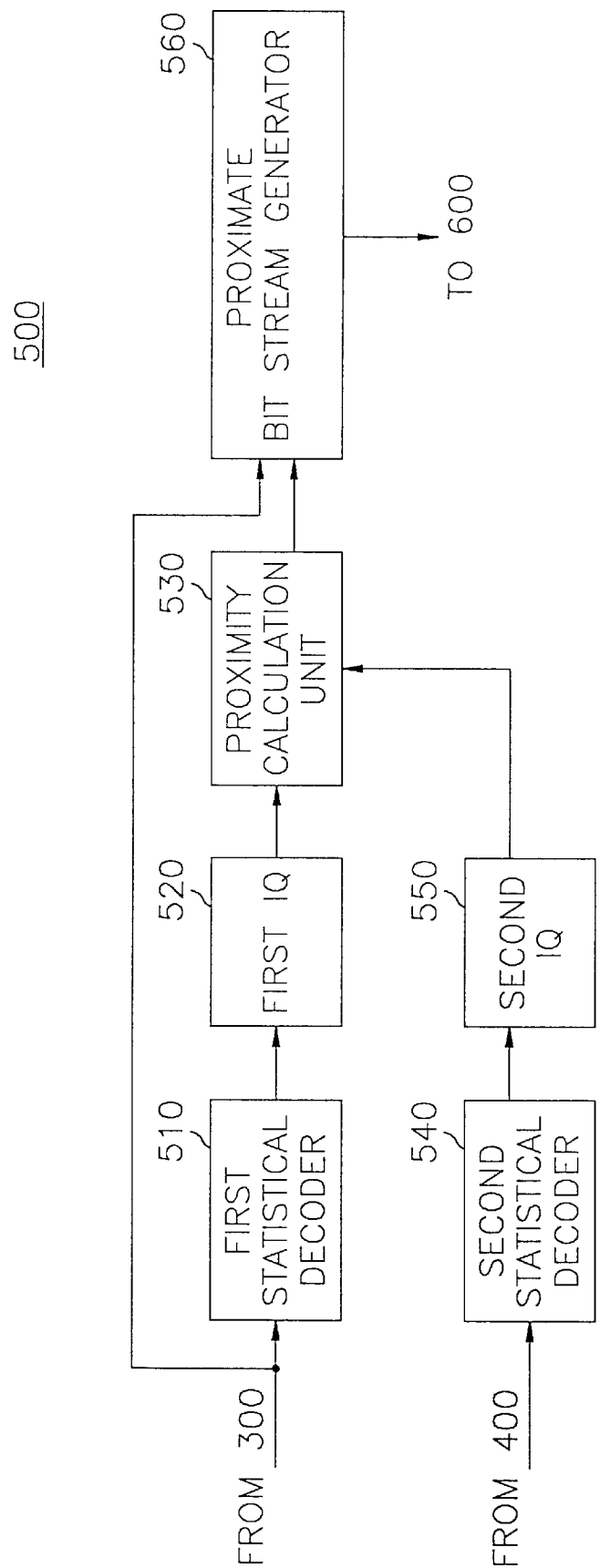
FIG. 2 shows a functional diagram of a proximate bit stream decision device shown in FIG. 1.

Referring to FIG. 2, there is illustrated a preferred embodiment of the proximate bit stream decision device 500 shown in FIG. 1. As shown in FIG. 2, the candidate bit streams from the candidate bit stream generator 300 are sequentially applied to a first statistical decoder 510 and a proximate bit stream generator 560, while the reference bit streams of the neighbor blocks from the adjacent block detector 400 are provided to a second statistical decoder 540.

At the first statistical decoder 510, each candidate bit stream is decoded by using, e.g., a variable length decoding (VLD) technique to produce statistically decoded data. And then, at a first inverse quantizer (IQ) 520, inverse quantization on the statistically decoded data from the statistical decoder 510 is carried out to provide a set of transform coefficients corresponding to each candidate bit stream as a set of candidate transform coefficients to a proximity calculation unit 530.

In the meantime, the second statistical decoder 540 performs statistical decoding on the reference bit streams of the neighbor blocks to produce statistically decoded data; and then a second IQ 550 carries out inverse quantization on the statistically decoded data to provide a set of transform coefficients on each reference bit stream as a set of reference transform coefficients to the proximity calculation unit 530. The proximity calculation unit 530 calculates a degree of proximity for each candidate bit stream in a frequency domain, not in a space domain, by employing a novel bit stream proximity calculation scheme of the invention which will be explained in detail with reference to FIGS. 3 to 5 hereinafter.

Figure 3:
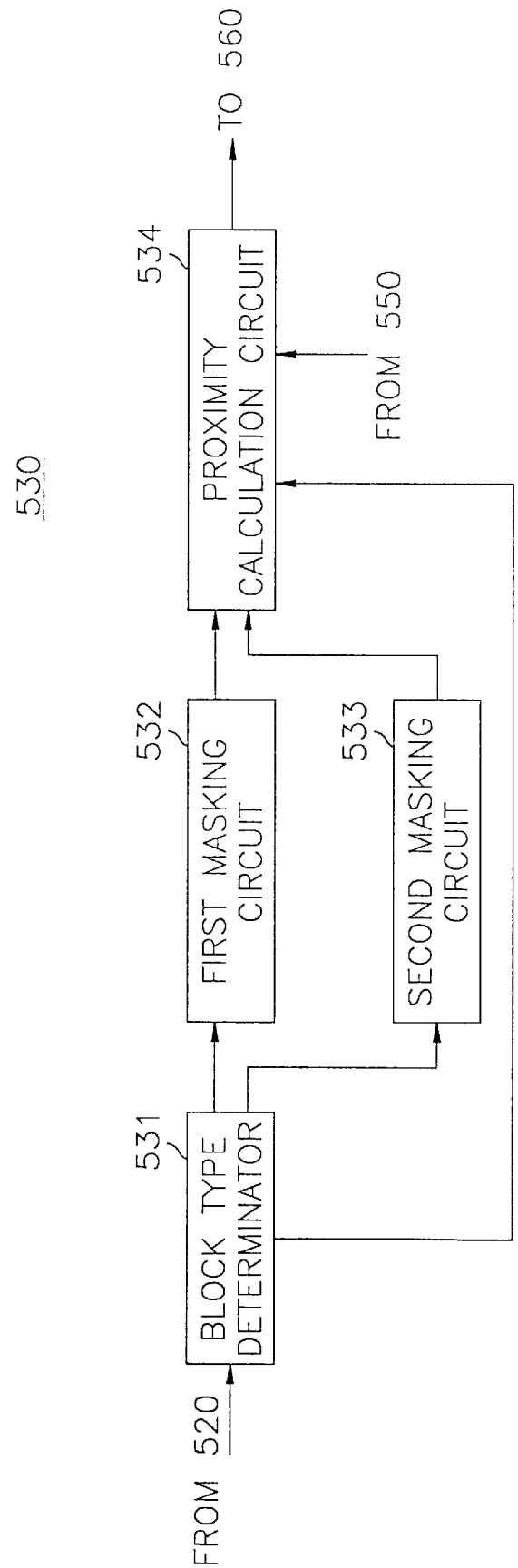
FIG. 3 presents a detailed block diagram of a proximity calculator shown in FIG. 2.

Turning now to FIG. 3, there is shown a detailed block diagram of the proximity calculation unit 530 of the present invention shown in FIG. 2. Each of the sets of candidate transform coefficients of the candidate blocks from the first IQ 520 shown in FIG. 2 is supplied to a block type determinator 531 to determine whether each candidate block is a first type block or a second type block. In a preferred embodiment of the invention, the first type block is defined as a block which contains more high frequency components than low frequency components; and the second type block is defined as a block which includes more low frequency components than high frequency components.

Figure 4:
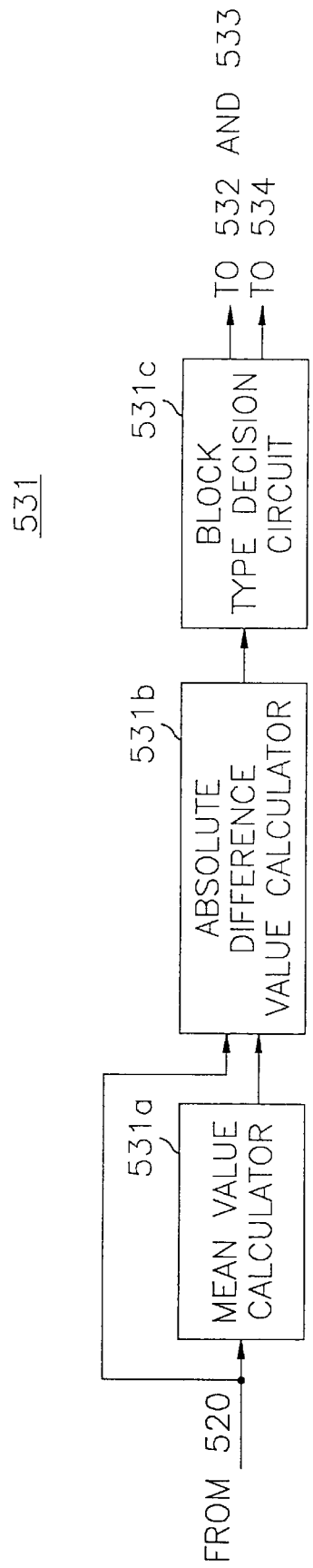
FIG. 4 offers a detailed block diagram of a block type determinator shown in FIG. 3.

Specifically, with reference to FIG. 4, a mean value of each of the sets of candidate transform coefficients of the candidate blocks from the first IQ 520 is first calculated at a mean value calculator 531a to thereby issue same to an absolute difference value calculator 531b. At the absolute difference value calculator 531b, absolute difference values between the mean value from the mean value calculator 531a for said each set of candidate transform coefficients and each of the candidate transform coefficients in said each set from the first IQ 520 are calculated; and thereafter, at a block type decision circuit 531c, they are summed up to provide a total absolute difference value of said each set of candidate transform coefficients. If the total absolute difference value is larger than a predetermined threshold value, it is decided that said each candidate block is the first type block, thereby outputting that block to a first masking circuit 532 shown in FIG. 3; and, if not, it is decided that said each candidate block is the second type block, thereby relaying said each candidate block to a second masking circuit 533 shown in FIG. 3. Further, a block type decision signal representing the first or the second type block is outputted from the block type decision circuit 531c to provide same to a proximity calculation circuit 534 shown in FIG. 3.

Referring back to FIG. 3, at the first masking circuit 532, a frequency region of each candidate block with 8×8 pixels applied thereto is first divided by N, e.g., 7, as illustrated in FIG. 5, wherein N is a positive integer larger than 1. And then, a first set of predetermined weighted values is assigned to respective corresponding divided regions; and then each of the predetermined weighted values in the first set is multiplied by each of candidate transform coefficients which belong to a divided region corresponding to said each predetermined weighted value to thereby obtain a first set of masked candidate transform coefficients. Similarly, the second masking circuit 533 first divides a frequency region of each candidate block with 8×8 pixels applied thereto by N. Subsequently, a second set of predetermined weighted values is assigned to the respective corresponding divided regions, wherein each predetermined weighted value in the second set is multiplied by each of candidate transform coefficients which are within a divided region corresponding to said each predetermined weighted value, thereby obtaining a second set of masked candidate transform coefficients. The first and the second sets of masked candidate transform coefficients obtained at the first and the second masking circuits 532 and 533, respectively, are then fed to the proximity calculation circuit 534.

At the proximity calculation circuit 534, degrees of proximity between each candidate bit stream and each of the neighbor bit streams are calculated. That is, to calculate the degrees of proximity, the sets of reference transform coefficients of the reference blocks from the second IQ 550 are first multiplied by either one of the first and the second sets of predetermined weighted values selected in response to the block type decision signal from the block type determinator 531, thereby obtaining sets of masked reference transform coefficients for all the reference blocks. And then, the degree of proximity for said each candidate bit stream is calculated based on the set of masked candidate transform coefficients of said each candidate bit stream and the sets of masked reference transform coefficients of all the reference bit streams.

For instance, if the upper and the left bit streams of the upper and the left blocks are selected as the reference bit streams, the degree of proximity $E_{TOTAL}$ for each candidate bit stream is defined as follows:

$$E_{TOTAL} = E_U + E_L$$

wherein an upper and a left proximities $E_U$ and $E_L$ represent the degrees of proximity between the set of masked candidate transform coefficients of the candidate block and the sets of masked reference transform coefficients of the upper and the left blocks, respectively. The upper and the left proximities $E_U$ and $E_L$ for said each candidate bit stream are calculated as follows, respectively:

$$E_U = \sum_{j=1}^{N} (C_j^{CAN} - C_j^U)^2$$

$$E_L = \sum_{j=1}^{N} (C_j^{CAN} - C_j^L)^2$$

wherein $C_j^{CAN}$, $C_j^U$ and $C_j^L$ represent j-th masked transform coefficients of said each candidate, the upper and the left bit streams, respectively, and N is the total number of transform coefficients. These processes are repeatedly performed until the degrees of proximity for all the candidate bit streams are calculated. When all the degrees of proximity are obtained, they are compared with each other to select a smallest degree of proximity among them; and provides the selected smallest degree of proximity to a proximate bit stream generator 560 shown in FIG. 2.

Referring back to FIG. 2, the proximate bit stream generator 560 substitutes the error bit stream with a proximate bit stream, wherein the proximate bit stream represents a candidate bit stream corresponding to the selected smallest degree of proximity among all the candidate bit streams provided from the candidate bit stream generator 300 shown in FIG. 1; and provides the proximate bit stream as the optimum bit stream to the buffer 600 shown in FIG. 1. In FIG. 1, the buffer 600 stores the optimum bit stream for each block by using the position data thereof, wherein the optimum bit stream is either the bit stream itself transmitted from the switch 200 or the proximate bit stream fed from the proximate bit stream decision device 500; and then the stored optimum bit stream is provided to a video signal decoder (not shown) for decoding process thereof.

While the present invention has been described with respect to the particular embodiments, it will be apparent to those skilled in the art that various changes and modifications may be made without departing from the spirit and scope of the invention as defined in the following claims.

What is claimed is:

1. A method for concealing bit errors in a bit stream of a video frame signal on a block-by-block basis to selectively provide either one of a proximate bit stream and the bit stream as an optimum bit stream to a video signal decoder, wherein the video frame signal is divided into a plurality of equal-sized blocks and bit numbers of bit streams for the blocks are different from each other, the method comprising the steps of:

(a) finding sequentially bit streams corresponding to the blocks based on the bit numbers thereof;

(b) checking a parity bit added to each bit stream to decide whether or not said each bit stream is an error bit stream having one or more error bits therein;

(c) if it is decided that said each bit stream is not an error bit stream, outputting said each bit stream as the optimum bit stream and, if otherwise, generating a plurality of candidate bit streams by using the error bit stream, and deciding whether each candidate bit stream has a first type of frequency characteristics or a second type of frequency characteristics to generate a type decision signal;

(d) in response to the type decision signal, masking said each candidate bit stream with either one of a first and a second set of predetermined weighted values to output a masked candidate bit stream therefor; and (e) producing a proximate bit stream for said each bit stream to provide same as the optimum bit stream, wherein the proximate bit stream is obtained based on degrees of proximity between said each masked candidate bit stream and reference bit streams spatially adjacent to the error bit stream, each reference bit stream having no errors or being already concealed errors therein.

2. The method according to claim 1, wherein the step (c) includes the steps of:

(c1) if said each bit stream is decided to be an error bit stream, generating the candidate bit streams by inverting one or more bits in the error bit stream;

(c2) decoding each candidate bit stream to obtain transform coefficients for said each candidate bit stream; and (c3) deciding whether said each candidate bit stream has the first type of frequency characteristics or the second type of frequency characteristics based on the transform coefficients for said each candidate bit stream, to generate the type decision signal.

3. The method according to claim 2, wherein the step (c3) has the steps:

(c31) calculating a mean value of the transform coefficients for said each candidate bit stream;

(c32) deriving absolute difference values between the mean value and each of the transform coefficients for said each candidate bit stream and obtaining a total absolute difference value by summing up the absolute difference values; and (c33) comparing the total absolute difference value with a predetermined threshold value to produce a comparison signal as the type decision signal to decide a type of said each candidate bit stream, wherein if the total absolute difference value is larger than the predetermined threshold value, implying that said each candidate bit stream contains more high frequency components than low frequency components, said each candidate bit stream is decided to have the first type of frequency characteristics to generate the comparison signal representing the decision result; and, if not, meaning that said each candidate bit stream contains more low frequency components than high frequency components, it is decided to have the second type of frequency characteristics to output the comparison signal corresponding to the decision result.

4. The method according to claim 3, wherein said generating step (e) has the steps of:

(e1) decoding each reference bit stream to derive transform coefficients for said each reference bit stream;

(e2) masking the transform coefficients for said each reference bit stream with a set of predetermined weighted values selected from the two sets of predetermined weighted values to obtain masked transform coefficients for said each reference bit stream, wherein the set of predetermined weighted values is selected depending on the type decision signal;

(e3) calculating sequentially each degree of proximity between the masked transform coefficients for said each candidate bit stream and the masked transform coefficients for said each reference bit stream to provide degrees of proximity for all the candidate bit streams;

(e4) comparing the degrees of proximity with each other to choose a smallest degree of proximity among them; and (e5) generating a candidate bit stream corresponding to the smallest degree of proximity as the optimum bit stream for the error bit stream.

5. The method according to claim 4, wherein each degree of proximity $E_{REF}$ of each candidate bit stream and each reference bit stream is calculated as follows:

$$E_{REF} = \sum_{j=1}^{N} (C_j^{CAN} - C_j^{REF})^2$$

wherein $C_j^{CAN}$ and $C_j^{REF}$ represent j-th masked transform coefficient of said each candidate and said each reference bit stream, respectively, and N is the total number of transform coefficients.

6. The method according to claim 1, wherein each candidate bit stream differs one bit from the error bit stream.

7. The method according to claim 1, wherein the reference bit streams are bit streams of a upper and a left blocks which are located at a upper and a left sides of a block of the error bit stream.

8. An apparatus for concealing bit errors in a bit stream of a video frame signal on a block-by-block basis to selectively provide either one of a proximate bit stream and the bit stream as an optimum bit stream to a video signal decoder, wherein the video frame signal is divided into a plurality of equal-sized blocks and bit numbers of bit streams for the blocks are different from each other, the apparatus comprising:

means for detecting sequentially bit streams of the blocks based on the bit numbers thereof;

error detection means for checking a parity bit added to each bit stream to decide whether or not said each bit stream is an error bit stream having one or more error bits therein;

type decision means, if it is decided that said each bit stream is not an error bit stream, outputting said each bit stream as the optimum bit stream and, if otherwise, generating a plurality of candidate bit streams by using the error bit stream, and deciding whether each candidate bit stream has a first type of frequency characteristics or a second type of frequency characteristics to generate a type decision signal;

masking means, in response to the type decision signal, masking said each candidate bit stream with either one of a first and a second set of predetermined weighted values to output a masked candidate bit stream therefor; and proximity bit stream generation means for producing a proximate bit stream for said each bit stream to provide same as the optimum bit stream, wherein the proximate bit stream is obtained based on degrees of proximity between said each masked candidate bit stream and reference bit streams spatially adjacent to the error bit stream, each reference bit stream having no errors or being already concealed errors therein.

9. The apparatus according to claim 8, wherein the type decision means includes:

candidate bit stream generation means, if said each bit stream is decided to be an error bit stream, generating the candidate bit streams by inverting one or more bits in the error bit stream;

means for decoding each candidate bit stream to obtain transform coefficients for said each candidate bit stream; and type determinator for deciding whether said each candidate bit stream has the first type of frequency characteristics or the second type of frequency characteristics based on the transform coefficients for said each candidate bit stream, to generate the type decision signal.

10. The apparatus according to claim 9, wherein the type determinator has:

mean value calculator for calculating a mean value of the transform coefficients for said each candidate bit stream;

total absolute difference value calculator for deriving absolute difference values between the mean value and each of the transform coefficients for said each candidate bit stream and obtaining a total absolute difference value by summing up the absolute difference values; and type decision circuit for comparing the total absolute difference value with a predetermined threshold value to produce a comparison signal as the type decision signal, wherein if the total absolute difference value is larger than the predetermined threshold value, implying that said each candidate bit stream contains more high frequency components than low frequency components, said each candidate bit stream is decided to have the first type of frequency characteristics to generate the comparison signal representing the decision result; and, if not, meaning that said each candidate bit stream contains more low frequency components than high frequency components, it is decided to have the second type of frequency characteristics to output the comparison signal corresponding to the decision result.

11. The apparatus according to claim 10, wherein the proximity bit stream generation means has:

decoding means for decoding each reference bit stream to derive transform coefficients for said each reference bit stream;

masking circuit for masking the transform coefficients for said each reference bit stream with a set of predetermined weighted values selected from the two sets of predetermined weighted values to obtain masked transform coefficients for said each reference bit stream, wherein the set of predetermined weighted values is selected depending on the type decision signal;

proximity calculation circuit for calculating sequentially each degree of proximity between the masked transform coefficients for said each candidate bit stream and the masked transform coefficients for said each reference bit stream to provide degrees of proximity for all the candidate bit streams;

means for comparing the degrees of proximity with each other to choose a smallest degree of proximity among them; and means for generating a candidate bit stream corresponding to the smallest degree of proximity as the optimum bit stream for the error bit stream.

12. The apparatus according to claim 11, wherein each degree of proximity $E_{REF}$ of each candidate bit stream and each reference bit stream is calculated as follows:

$$E_{REF} = \sum_{j=1}^{N} (C_j^{CAN} - C_j^{REF})^2$$

wherein $C_j^{CAN}$ and $C_j^{REF}$ represent j-th masked transform coefficient of said each candidate and said each reference bit stream, respectively, and N is the total number of transform coefficients.

13. The apparatus according to claim 8, wherein each candidate bit stream differs one bit from the error bit stream.

14. The apparatus according to claim 8, wherein the reference bit streams are bit streams corresponding to a upper and a left blocks which are located at a upper and a left sides of a block of the error bit stream.

* * * * *